United States Patent
Lidén et al.

(10) Patent No.: US 6,654,513 B1
(45) Date of Patent: Nov. 25, 2003

(54) PATH MONITORING IN OPTICAL COMMUNICATION SYSTEMS

(75) Inventors: Fredrik Lidén, Norsborg (SE); Johan Sandell, Enskede (SE); Sven Wingstrand, Älvsjö (SE); Magnus Öberg, Hägersten (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/762,995

(22) PCT Filed: Aug. 5, 1999

(86) PCT No.: PCT/EP99/05671

§ 371 (c)(1),
(2), (4) Date: Jul. 16, 2001

(87) PCT Pub. No.: WO00/10268

PCT Pub. Date: Feb. 24, 2000

(30) Foreign Application Priority Data

Aug. 14, 1998 (EP) ............................................. 98115350

(51) Int. Cl.⁷ ............................ G02B 6/28; G02B 6/26; G02B 6/42; H04B 10/72
(52) U.S. Cl. ............................. 385/24; 385/31; 385/27; 359/341.1; 359/341.3; 359/341.4; 359/341.41; 359/341.44
(58) Field of Search ............................... 385/15, 14, 27, 385/31; 359/341.1, 341.3, 341.44, 341.4

(56) References Cited

U.S. PATENT DOCUMENTS

| | | | | |
|---|---|---|---|---|
| 5,668,658 A | * | 9/1997 | Hamada | 359/341.43 |
| 5,917,969 A | * | 6/1999 | Gavrilovic et al. | 385/15 |
| 6,215,583 B1 | * | 4/2001 | Lagerström et al. | 359/341.1 |
| 2001/0017729 A1 | * | 8/2001 | Sugaya et al. | 359/341.41 |
| 2001/0030796 A1 | * | 10/2001 | Yao | 359/334 |

FOREIGN PATENT DOCUMENTS

| | | | | |
|---|---|---|---|---|
| EP | 0 753 913 | | 1/1997 | |
| EP | 753913 A1 | * | 1/1997 | H01S/3/06 |
| EP | 0 851 704 | | 7/1998 | |
| EP | 851704 A2 | * | 7/1998 | H04Q/11/00 |

OTHER PUBLICATIONS

International Search Report relating to PCT/EP99/05671, Date: Jan. 12, 2000.
PJ Chidgey et al.: "Diverse Routing of Multiplexed Signals in an Amplified Wavelenght Routed Network" Proceedings of the European Conference on Optical Communication (EC, Amsterdam, Sep. 16–20, 1990, Regular Papers, vol. 1, No. CONF 16, pp. 157–160 (XP000449197) (English).
K Shimizu et al.: "Supervisory Signal Transmission Experiments over 10,000 KM by Modulated ASE of EDFAS Electronics Letters" vol. 29, No. 12, Jun. 10, 1993, pp. 1081–1083 (English).

* cited by examiner

Primary Examiner—John D. Lee
Assistant Examiner—Daniel Valencia

(57) ABSTRACT

An optical communication line having optical fiber amplifiers including a pump laser can be configured to suppress the transmission of optical signals by reducing the power of the pump laser. In order that the portion of the line downstream of the amplifier can be monitored for fiber breaks causing only negligible crosstalk with a parallel working line, and with the elimination of the risk of mistaking reflections from a working line for light emitted by the standby amplifier, the light emitted by the standby amplifier is modulated by a low frequency control tone. The modulated laser light causes modulation of the amplified spontaneous emission (ASE) generated in the amplifier to create a control tone. Monitoring means disposed at the end of the optical line detect this control tone and use this as the criteria for a functional connection downstream the amplifier.

30 Claims, 2 Drawing Sheets

PATH MONITORING IN OPTICAL COMMUNICATION SYSTEMS

FIELD OF THE INVENTION

The present invention relates to optical fibre communication lines that are configured to operate in stand-by, that is to attenuate or substantially suppress the transmission of signals, but can still be monitored for cable ruptures or other defects. The invention is particularly relevant to optical systems wherein a redundancy of optical fibre cables is provided for added protection, and specifically to wavelength division multiplexed systems. The invention further concerns optical fibre amplifiers suitable for use in an optical communication line that may be configured to operate in standby, and a method for monitoring the operation of an optical communication line configured to operate in standby.

BACKGROUND ART

In many optical communication applications it is important to block the transmission of signals through individual paths, at least temporarily. One application is the duplication of an optical link connecting terminal stations so that operations can continue following failure of one of the lines. Such an arrangement is of particular importance for optical wavelength division multiplexed (WDM) systems in which large amounts of traffic are borne by a single fibre.

In a known WDM point-to-point system multiple signals are multiplexed at a transmitting terminal onto a single optical fibre cable which is then split into two paths using a fibre coupler. The signals on each path are amplified at the transmitting end by an optical fibre power amplifier and at the receiving end by an optical fibre pre-amplifier. Optical fibre amplifiers comprising a doped fibre into which is coupled pumped optical radiation from a pumping laser are well known in this field and are for example disclosed on pages 402 to 404 of IEEE Proceedings J, vol. 135, no. 6, 1988 pp 385–407, P. Urquhart, 'Review of rare earth doped fibre lasers and amplifiers'. The two paths are then recombined using a fibre coupler at the receiving terminal prior to demultiplexing. Further optical amplifiers may be provided along the paths to compensate for signal attenuation if the distance between the terminal stations is large.

At any one time only one of these paths should be active to prevent interference cross talk between the signals at the receiver. However, if redundancy is to be preserved, the inactive line must be in working order. Thus it is desirable to continually monitor the state of the inactive or standby line so that any fault can be detected and if possible repaired.

In the known system this is done to a limited extent by keeping all but the final optical fibre amplifier active. The final amplifier, generally the pre-amplifier, is almost turned off thus blocking the signals. If the pumping energy is sufficiently low, substantially all light energy input into the amplifier will be absorbed.

Since the signals in the redundant path are propagated up to the pre-amplifier, the correct operation of the path upstream of this amplifier can be verified in the normal fashion by monitoring the propagated light signals.

However it is also desirable to monitor the fibre section between the pre-amplifier and the demultiplexer as well as the operation of the pre-amplifier itself. A possible solution is to have the pre-amplifier 'glowing' i.e. to drive the pump laser at a low power, so that a signal resulting from amplified spontaneous emission (ASE) generated in the amplifier is propagated by this fibre section. The power should be so low that the signal is attenuated sufficiently not to cause cross talk penalty at the receiver, but large enough to be monitored as light at the input of the receiver. The problem with this arrangement is that reflections of the light signal from the working section occurring at the various device interfaces may be stronger than the low power light from the 'glowing' pre-amplifier. As a result it is very difficult to determine whether light detected on the standby path downstream of the 'glowing' pre-amplifier originates from this pre-amplifier or from the working path. Accordingly a broken fibre in this fibre section may not be detected.

It is therefore an object of the invention to provide an optical communication line which may be monitored reliably and in its entirety even when configured to block signals.

SUMMARY OF THE INVENTION

In an optical communication line that may be configured to block signals using an optical fibre amplifier, this object is achieved according to the invention by providing modulating means adapted to superimpose a control tone on the amplifier output signal at least when the amplifier is configured to attenuate received signals, and by providing monitoring means downstream of the amplifier for detecting the control tone. In a preferred embodiment, the pumping radiation of the optical amplifier is modulated, resulting in modulated amplified spontaneous emission at the output of the amplifier.

By modulating the amplifier output signal with a control frequency, a recognisable and distinct signal will be generated even when the amplifier is driven to attenuate any received signals. Since the modulating means specifically detect this control frequency rather than simply a predetermined level of light energy, the correct functioning can be reliably determined simply by ascertaining the presence or absence of this control tone.

According to a further aspect of the invention this arrangement is applied to an optical communications system with transmitting means and receiving means that are interconnected by at least two optical fibre cables arranged in parallel. An optical fibre amplifier on one of the lines comprises modulating means for superimposing a control tone on the amplifier optical output signal at least when the amplifier is configured to attenuate signals. The control tone is detected by monitoring means arranged downstream of the amplifier. When this system is configured with one path working and the signals in the other path blocked by the optical fibre amplifier, the correct functioning of the inactive cable can be reliably ascertained. In particular, the risk of mistaking reflections from the working cable for the low power light from the optical amplifier of the standby cable is substantially eliminated, since the presence of the control tone frequency is the criteria for determining a functioning connection between the amplifier and the receiving means. In a further embodiment of the invention this arrangement is applied to a wavelength division multiplexed system.

A further aspect of the invention resides in an optical fibre amplifier suitable for use in an optical communications line which has modulating means adapted to superimpose a control tone on the amplifier output signal. This amplifier is capable of emitting a distinct and recognisable signal, even when operating at low power to block incoming light signals, and hence enables both its own function and the integrity of any subsequent optical fibre link to be verified reliably.

The above object is further achieved according to another aspect of the present invention in a method for monitoring the operation of an optical communication line including modulating the amplitude of the optical amplifier output signal a control tone and ascertaining the condition of the line by determining the intensity of said control tone on said optical fibre cable.

BRIEF DESCRIPTION OF THE DRAWINGS

Further objects and advantages of the present invention will become apparent from the following description which describes a preferred embodiment of the invention by way of example with reference to the accompanying drawings, in which.

DETAILED DESCRIPTION OF THE DRAWINGS

Figure 1:
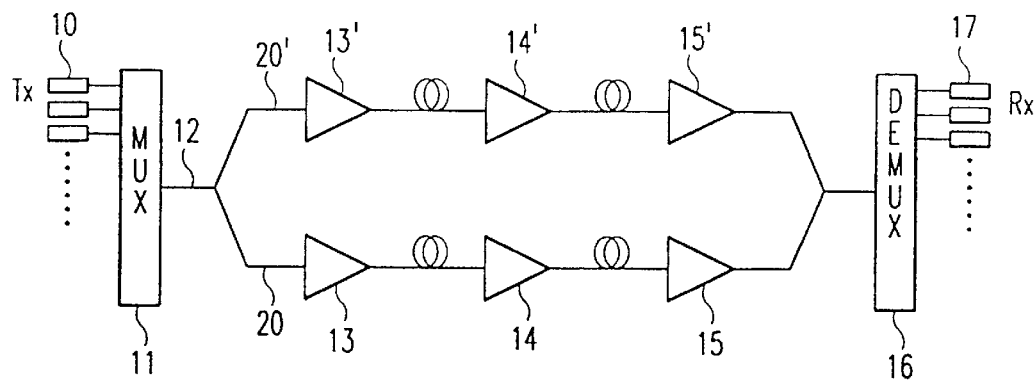
FIG. 1 schematically depicts an optical wavelength division multiplexed point-to-point system with duplicated paths including a working path and a protection path, and FIG. 2 schematically shows the receiving end of an optical WDM point-to-point system with a working path and protection path, the protection path being configured in accordance with the invention.

The WDM point-to-point system shown in FIG. 1 comprises WDM transmitters 10 each of which sends a payload data signal modulated onto a carrier wavelength to a multiplexer 11 which, in turn, combines the signals onto a single fibre 12. This fibre 12 is then split into two paths 20, 20' by means of a 1×2 or 2×2 fibre coupler. The multiplexed signals in each path are thus propagated in parallel through a first optical amplifier, or power amplifier 13, 13', through optical line amplifiers 14, 14', only one of which is shown in each path in this example for convenience, and through a final amplifier or pre-amplifier 15, 15', respectively. The fibres of the two paths 20, 20' are then recombined before entering a demultiplexer 16, which separates the signals according to wavelength and passes the signals to a WDM receiver 17. The optical power amplifiers 13, 13' and line amplifiers 14, 14' may be constituted by any suitable optical amplifiers, including, but not limited to, optical repeaters of the regenerative type or optical fibre amplifiers such as disclosed in the above-mentioned reference.

Figure 2:
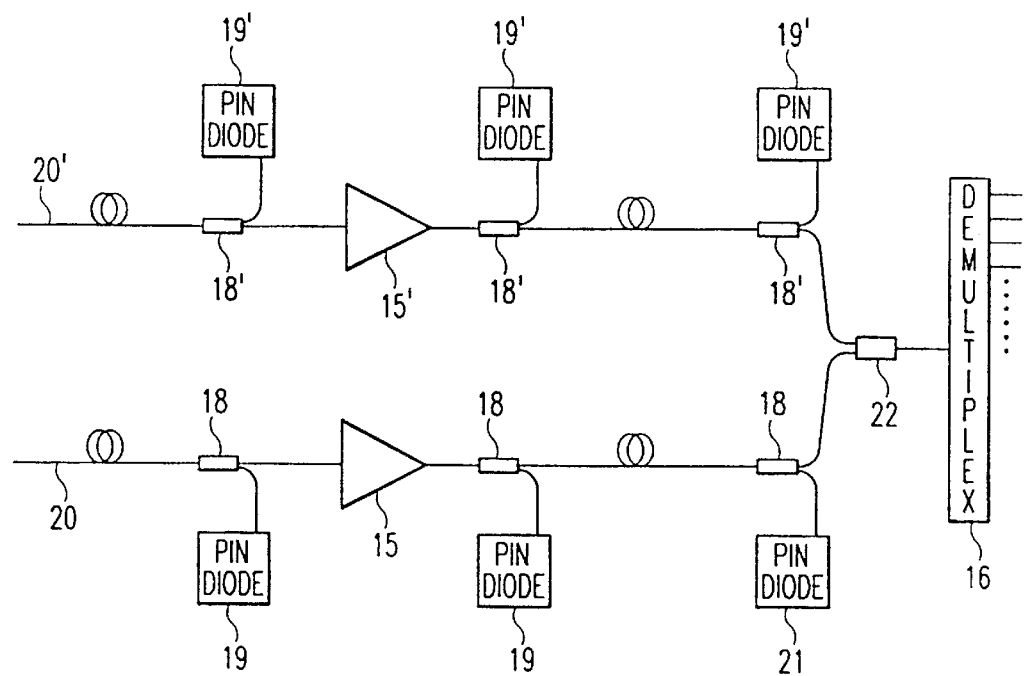

FIG. 2 shows the receiving end of the point-to-point WDM system. From this figure it is apparent that optical taps 18, 18' and associated detectors 19, 19' are provided on the two lines 20, 20' before and after the pre-amplifiers 15, 15'. The detectors preferably take the form of monitoring PIN diode receivers, although it will be understood that any suitable device capable of converting the tapped optical signal into electrical energy could be utilized. Although not shown in FIG. 1, similar optical taps and associated detectors are provided before and after each amplifier in both lines 20, 20' for extracting a small portion of the incident optical power to enable the connections and functions of the paths to be monitored at each stage. In addition, a further optical tap 18 and 18' and associated detectors 21, 19' are connected to each of the fibres directly upstream of the recombining of the two paths 20 and 20' in an optical combiner 22.

In this point-to-point system, the signals are propagated from the multiplexer 11 to the demultiplexer 16 only by the working path 20'. Hence, all the amplifiers 13', 14', 15' on this path are operating normally to amplify the optical signals. In the protection path 20, the signals are propagated through the power amplifier 13 and the line amplifiers 14 up to the pre-amplifier 15. The normal operation of the power amplifier 13 and line amplifiers 14 of the protection path 20 is necessary to enable detection of any interruption in transmission due to a fibre break or a faulty connection by the associated detectors 19 upstream of the pre-amplifier 15. However to prevent interference cross talk between duplicate signals arriving at the demultiplexer, the final amplifier 15 on the protection path is configured to block the incoming signals.

Figure 3:
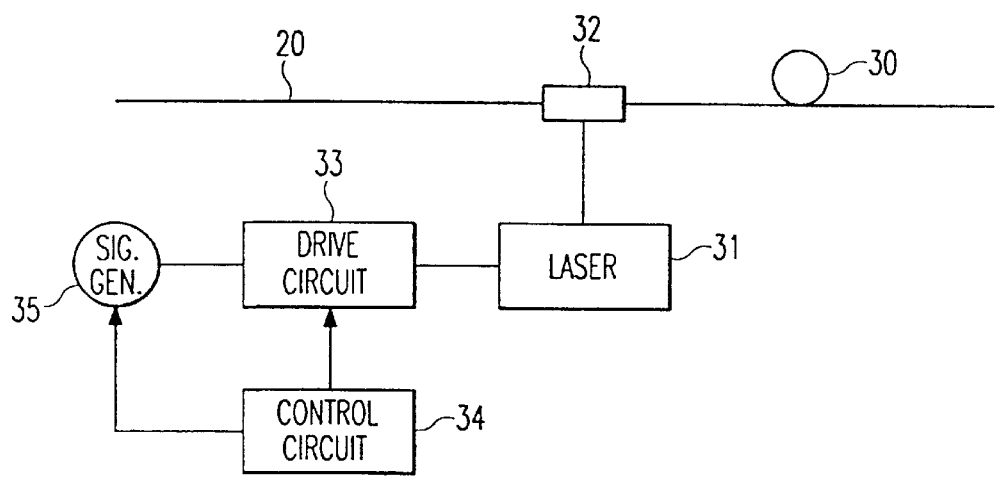
FIG. 3 shows, as a block diagram, the optical fibre pre-amplifier for use in the system of FIGS. 1 and 2.

FIG. 3 shows the principle of operation of the optical fibre amplifier 15 utilised as a pre-amplifier 15 in the protection path 20. The amplifier comprises a fibre section 30 doped with rare earth ions or a similar fluorescent substance into which is coupled the optical input signal. Optical pumping energy from a pump laser 31 is likewise coupled into the doped fibre section 30 through an optical coupler 32. The pump laser 31 is driven by a drive current supplied by a drive circuit 33. The drive circuit 33 is in turn controlled by a control circuit 34. This control circuit may be arranged in the optical amplifier unit or be located remote from the amplifier 15 and connected via a separate and possibly dedicated supervisory or control channel. The control circuit may contain dedicated circuitry but preferably incorporates a microprocessor or similar data processing means with associated memory.

If the pre-amplifier 15 is to prevent incoming signals from being propagated in the final fibre section between the pre-amplifier 15 and the optical combiner 22, the drive circuit 33 is controlled by the control circuit 34 to supply a low power to the pump laser 31 which accordingly supplies a low optical pumping energy to the doped fibre 30. When the optical pumping energy to the doped fibre section 30 falls below a certain level, substantially all the light energy of the incoming optical signals will be absorbed and the signals attenuated rather than amplified. In this state the amplifier 15 is described as 'glowing'. However, amplified spontaneous emission will always occur while optical power from the laser is pumped to the doped fibre section. Accordingly a low power light signal will be present at the output of this pre-amplifier 15.

A modulating generator 35 operating at a predetermined low frequency is likewise connected to the drive circuit 33 and controlled by the control circuit 34. When the amplifier 15 is configured to attenuate the incoming optical signals, the modulating generator 35 modulates the pump laser drive current. Provided that the modulation frequency is sufficiently low, i.e. lower than the spontaneous lifetime of the excited electrons in the doped fibre 30, the resulting modulation of the pump laser light will cause the modulation of the amplified spontaneous emission (ASE). The modulated ASE which serves as a pilot or control tone can then be detected by the last PIN diode receiver 21 disposed directly upstream of the optical combiner 22.

Although in the arrangement of the optical fibre amplifer 15 described above, the superposition of a control tone on the amplifier output signal is achieved by modulating the pump laser current, it will be understood that modulation can be imposed elsewhere in the optical fibre amplifier 15. For example, modulated light could be coupled directly into the active fibre together with the pumping radiation, or alternatively directly into the output fibre of the optical amplifier using an optical coupler.

Because the pre-amplifier 15 emits a tone and not simply a low dc power level, the pin diode receiver 21 can reliably distinguish the light energy originating from the protection path from any reflections of the signals propagated through the working path caused by imperfect connections at the optical combiner 22 or the demultiplexer 16. Preferably, the pin diode receiver 21 includes a synchronous receiver tuned to the ASE modulation frequency to increase the detection sensitivity. This allows the glowing power of the pump laser to be reduced even further to render negligible any potential risk of cross talk between the control tone and the propagated signal at the receiver 16, 17.

The ratio of the output powers of the pre-amplifier 15' of the working section and the pre-amplifier 15 of the protection section is selected to minimise crosstalk but also to enable the PIN diode receivers 21, 19' on each path to clearly distinguish between the working section light signal and the protection section light signal, so that loss of power in either the working section or the protection section can be reliable detected. A ratio of around 30 dB has proved to be suitable for this purpose.

In a further possible arrangement of the pre-amplifier 15, the modulating generator 35 is configured to intervene permanently to modulate the pump laser drive current by a low frequency signal i.e. even when the amplifier 15 is operating at normal power to amplify the incoming signals. The low modulation level necessary for ensuring detection by the PIN diode receiver 21 when the pre-amplifier 15 is operating at reduced power will produce a substantially negligible ripple on the propagated data signals when the protection path is active, and therefore will not adversely affect normal traffic flow.

The operation of the system is as follows.

During normal operation the uppermost optical fibre line 20' shown in FIGS. 1 and 2 will be active while the lowermost line 20 is in standby. Signals transmitted by the WDM transmitter 10 and multiplexed onto the single fibre section 12 by the multiplexer 11 will be propagated through the working path 20 to the demultiplexer 16 and WDM receiver 17, and also through the protecting path 20 as far as the pre-amplifier 15. In its standby state this amplifier 15 is configured to attenuate incoming signals, i.e. the pump laser 31 of this latter amplifier 15 is driven at low power ('glowing'). The pump laser light is also modulated by a low frequency signal generated by the signal generator 35 causing a control tone to be superimposed on the ASE generated in the doped fibre 30.

The PIN diode receivers 19' along the working path monitor the level of the transmitted signal to determine whether the working path is functioning correctly. The PIN diode receivers 19 upstream of the pre-amplifier in the protection path likewise monitor the light power level to ascertain the integrity of this section of the line. The PIN diode receiver 21 at the input of the optical combiner 22 also monitors the line but specifically detects the presence or absence of the control tone.

If a problem occurs on the working path 20', this is detected by one or more of the PIN diode receivers 19'. The pre-amplifier 15' of the working section will then be turned off, or alternatively configured to 'glow', and the pre-amplifier 15 of the protection path 20 can be switched into operation to enable the transmitted light signals modulated with data to be propagated through the whole of the protection path 20 to the receivers 17.

However, if a fibre break occurs on the protection path while this line is in standby, this will be detected either as a loss of power by one or more of the PIN diode receivers 19 upstream of the pre-amplifier 15, or alternatively as an absence of the control tone by the PIN diode receiver 21 which indicates that the problem is located between the pre-amplifier 15 and the demultiplexer 16. In either scenario, a switch-over of traffic relay from the working path to the protection path in the event of a loss of power in the working path will be blocked.

From the above description it will be apparent that the pre-amplifier 15' of the working section 20' could also be provided with a means for modulating the ASE at least when this amplifier is configured to block optical input signals after a path switch. In this case the final PIN diode receiver 19' of the working path 20' and the PIN diode receiver 21 of the protection path 20 could both be designed to selectively detect a loss of power of the transmitted signal or an absence of control tone. In this way full redundancy can be provided wherein either one of the paths may be configured as the active path while the other is in standby.

It will further be apparent that the invention is not limited to systems providing redundancy. In particular the invention also has application in systems wherein two or more lines carrying information from different sources arrive at a single receiver. To prevent cross talk interference it is imperative that all but one of the lines be operative at any one time, and accordingly the pre-amplifiers or final line amplifiers of the remaining links are configured to block the transmitted signals. With the arrangement according to the invention these lines can be continually monitored through to the receiving section so that any fault arising may be detected and if possible repaired before the line is brought into service. Clearly different modulation frequencies could then be used to modulate the pumping light radiation of each line in standby so that the condition of each line can be ascertained.

In a further conceivable application, the arrangement according to the invention could be utilized in an optical system, which may be wavelength division multiplexed, having a hub comprising a plurality of line sections connected in series, wherein individual sections can be turned off, i.e. the associated optical fibre amplifier driven to "glow", to enable different path configurations between lines running into and out of the hub. Again, in this arrangement the reliability of the system can be significantly improved using the arrangement and method according to the invention by permitting the full monitoring of any standby sections.

What is claimed is:

1. An optical communications line comprising:
   at least one optical fibre cable;
   an optical fibre amplifier;
   receiving means coupled to said optical fibre cable downstream of said optical fibre amplifier for receiving optical output signals from said optical fibre amplifier;
   wherein said optical fibre amplifier comprises at least one source of optical pumping radiation and is configurable to attenuate signals received via said optical fibre cable;
   modulating means associated with said optical fibre amplifier for superimposing a control tone on an output signal of said optical fibre amplifier at least when said optical fibre amplifier is configured to attenuate the received optical output signals such that incoming signals are substantially blocked by said optical fibre amplifier; and
   monitoring means arranged between said optical fibre amplifier and said receiving means for monitoring the intensity of said control tone.

2. The optical communications line as claimed in claim 1, wherein said modulating means is associated with said optical pumping radiation source for modulating the output of said optical fibre amplifier.

3. The optical communications line as claimed in claim 1 or 2, wherein at least one further optical fibre amplifier is arranged on said optical fibre cable upstream of said optical fibre amplifier.

4. The optical communications line as claimed in claim 1, wherein said receiving means is connected to receive optical signals from at least one further optical fibre cable.

5. The optical communications line as claimed in claim 4, wherein said at least one optical fibre cable is coupled by an optical combiner at an input of said receiving means.

6. The optical communications line as claimed in claim 5, wherein said monitoring means is arranged upstream of said optical combiner.

7. The optical communications line as claimed in claim 4, wherein a second optical fibre amplifier is arranged on said at least one further optical fibre cable.

8. The optical communications line as claimed in claim 7, wherein said second optical fibre amplifier on said at least one further optical fibre cable is configurable to attenuate received signals, and modulating means is associated with said optical fibre amplifier for superimposing a control tone on the output signal of said optical fibre amplifier at least when said optical fibre amplifier is configured to attenuate the transmitted signals, and monitoring means is arranged between said optical amplifier and the input of said receiving means for monitoring the intensity of said control tone.

9. The optical communications line as claimed in claim 8, wherein said modulating means is associated with the optical pumping radiation source of said optical fibre amplifier.

10. The optical communications line as claimed in claim 1, wherein said control tone is an extremely low frequency signal.

11. The optical communications line as claimed in claim 1, wherein said monitoring means comprises a PIN diode receiver.

12. The optical communications line as claimed in claim 1, wherein said monitoring means comprises a synchronous receiver sensitive to said control tone.

13. An optical communications system comprising:
transmitting means and receiving means interconnected by at least two optical fibre cables arranged in parallel, at least one of said at least two optical fibre cables including an optical fibre amplifier and comprising at least one source of optical pumping radiation, the optical amplifier of at least one line being configurable to attenuate signals received on a corresponding optical fibre line;
modulating means associated with the optical fibre amplifier of said at least one line for superimposing a control tone on an output signal of said optical fibre amplifier at least when said optical fibre amplifier is configured to attenuate transmitted signals such that incoming signals are substantially blocked by said optical fibre amplifier; and
monitoring means arranged between said optical amplifier and the input of said receiving means for monitoring the intensity of said control tone on said at least one line.

14. The optical communications system as claimed in claim 13, wherein said modulating means is associated with said optical pumping radiation source to modulate the optical pumped radiation.

15. A wavelength division multiplexed optical communication system comprising:
transmitting means and receiving means including a demultiplexer and a receiver, said transmitting means and receiving means being interconnected by at least two optical fibre lines arranged in parallel;
at least one optical fibre line of said at least two optical fibre lines, said at least one optical fibre line comprising an optical amplifier connected to an input of said demultiplexer, said optical amplifier comprising at least one source of optical pumping radiation;
wherein at any one time the optical amplifier of at least one line is configured to attenuate signals transmitted from said transmitting means to said receiving means;
modulating means associated with the optical amplifier of said at least one line for superimposing a control tone on an output signal of said optical fibre amplifier at least when said optical amplifier is configured to attenuate said transmitted signals such that incoming signals are substantially blocked by said optical fibre amplifier; and
monitoring means arranged between said optical fibre amplifier and the input of said demultiplexer for monitoring the intensity of said control tone.

16. The wavelength division multiplexed optical communications system as claimed in claim 15, wherein said modulating means is associated with said optical pumping radiation source of said optical fibre amplifier of said at least one line to modulate the optical pumped radiation.

17. An optical fibre amplifier for an optical communications line, the optical fibre amplifier comprising:
at least one fibre section doped with fluorescent substance;
at least one source of optical pumping radiation coupled to said doped fibre section, said at least one source of optical pumping radiation being configurable to selectively attenuate or amplify received signals; and
modulating means to superimpose a control tone on the output signal of said optical fibre amplifier at least when said optical fibre amplifier is configured to attenuate transmitted signals such that incoming signals are substantially blocked by said optical fibre amplifier.

18. The optical fibre amplifier as claimed in claim 17, wherein said modulating means is associated with said at least one source of optical pumping radiation to modulate said optical pumping radiation.

19. The optical fibre amplifier as claimed in claim 18, wherein said modulating means is arranged to modulate a drive current of said at least one source of optical pumping radiation.

20. A method for monitoring the operation of an optical communication line, said optical communication line including an optical fibre cable with an optical fibre amplifier having a source of optical pumping radiation and being configured to attenuate received signals such that incoming signals are substantially blocked by said optical fibre amplifier, said method comprising:
modulating an amplitude of said optical fibre amplifier output signal with a control tone; and
ascertaining a condition of the communications line by determining an intensity of said control tone on said optical fibre cable.

21. The method as claimed in claim 20, further including modulating an amplitude of an optical pumping radiation with a control tone to modulate the spontaneous emission of said optical fibre amplifier.

22. An optical communications line comprising:
at least one optical fibre cable;
an optical fibre amplifier;

receiving means coupled to said optical fibre cable downstream of said optical fibre amplifier for receiving optical output signals from said optical fibre amplifier;

wherein said optical fibre amplifier comprises at least one source of optical pumping radiation and is configurable to attenuate signals received via said optical fibre cable;

modulating means associated with said optical fibre amplifier for superimposing a control tone on an output signal of said optical fibre amplifier at least when said optical fibre amplifier is configured to attenuate the received optical output signals; and monitoring means arranged between said optical fibre amplifier and said receiving means for monitoring the intensity of said control tone, wherein said receiving means is connected to receive optical signals from at least one further optical fibre cable, wherein said at least one optical fibre cable is coupled by an optical combiner at an input of said receiving means, and wherein said monitoring means is arranged upstream of said optical combiner.

23. The optical communications line as claimed in claim 22, wherein said modulating means is associated with said optical pumping radiation source for modulating the output of said optical fibre amplifier.

24. The optical communications line as claimed in claim 22, wherein at least one further optical fibre amplifier is arranged on said optical fibre cable upstream of said optical fibre amplifier.

25. The optical communications line as claimed in claim 22, wherein a second optical fibre amplifier is arranged on said at least one further optical fibre cable.

26. The optical communications line as claimed in claim 25, wherein said second optical fibre amplifier on said at least one further optical fibre cable is configurable to attenuate received signals, and modulating means is associated with said optical fibre amplifier for superimposing a control tone on the output signal of said optical fibre amplifier at least when said optical fibre amplifier is configured to attenuate the transmitted signals, and monitoring means is arranged between said optical amplifier and the input of said receiving means for monitoring the intensity of said control tone.

27. The optical communications line as claimed in claim 26, wherein said modulating means is associated with the optical pumping radiation source of said optical fibre amplifier.

28. The optical communications line as claimed in claim 22, wherein said control tone is an extremely low frequency signal.

29. The optical communications line as claimed in claim 22, wherein said monitoring means comprises a PIN diode receiver.

30. The optical communications line as claimed in claim 22, wherein said monitoring means comprises a synchronous receiver sensitive to said control tone.

* * * * *